(12) United States Patent
Toopran

(10) Patent No.: US 11,653,173 B2
(45) Date of Patent: May 16, 2023

(54) ELECTRONIC DEVICE MONITORING SYSTEM

(71) Applicant: Toyota Motor Engineering & Manufacturing North America, Inc., Plano, TX (US)

(72) Inventor: Divya Sai Toopran, Sunnyvale, CA (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 96 days.

(21) Appl. No.: 17/199,927

(22) Filed: Mar. 12, 2021

(65) Prior Publication Data
US 2022/0295216 A1 Sep. 15, 2022

(51) Int. Cl.
H04W 4/02 (2018.01)
H04W 4/021 (2018.01)
B60R 16/023 (2006.01)
B60K 35/00 (2006.01)
B60Q 9/00 (2006.01)

(52) U.S. Cl.
CPC ............. *H04W 4/021* (2013.01); *B60K 35/00* (2013.01); *B60Q 9/00* (2013.01); *B60R 16/0232* (2013.01); *B60K 2370/152* (2019.05); *B60K 2370/157* (2019.05)

(58) Field of Classification Search
CPC ......... H04W 4/021; B60K 35/00; B60Q 9/00; B60R 16/0232
See application file for complete search history.

(56) References Cited

U.S. PATENT DOCUMENTS

2007/0120644 A1* 5/2007 Seike ................. G07C 9/00309
340/426.36

* cited by examiner

*Primary Examiner* — Curtis B Odom
(74) *Attorney, Agent, or Firm* — Snell & Wilmer LLP

(57) ABSTRACT

Methods, systems, and apparatus for monitoring a vehicle. The system includes a sensor of the vehicle configured to detect sensor data indicating a presence of an electronic device within the vehicle. The system also includes an electronic control unit (ECU) of the vehicle communicatively coupled to the sensor. The ECU is configured to determine whether the electronic device is within the vehicle. The ECU is also configured to provide a notification to a user of the vehicle regarding the presence of the electronic device within the vehicle.

19 Claims, 7 Drawing Sheets

ELECTRONIC DEVICE MONITORING SYSTEM

BACKGROUND

1. Field

This specification relates to a system and a method for monitoring a vehicle for personal electronics.

2. Description of the Related Art

A vehicle may be able to transport occupants as well as cargo of the occupants. A vehicle may include a rear compartment or a trunk for storing cargo. For example, a trunk of a vehicle may be used to store sporting equipment, such as basketballs and golf clubs, luggage, groceries, boxes, and clothes, for example. Some occupants of the vehicle may also store personal electronics within the trunk, such as laptops, tablets, or smartphones. These personal electronics may be placed in the trunk, or may be located within another vessel (e.g., a bag) that is located in the trunk. While the personal electronics are in the trunk and the vehicle is parked, the occupant(s) of the vehicle may leave the area (e.g., to enter a store, to enter a home, to enter an office, to board an airplane, etc.) and the vehicle may be broken into, and the personal electronics may be stolen. Thus, there is a need for improved monitoring for personal electronics within a vehicle.

SUMMARY

What is described is a system for monitoring a vehicle. The system includes a sensor of the vehicle configured to detect sensor data indicating a presence of an electronic device within the vehicle. The system also includes an electronic control unit (ECU) of the vehicle communicatively coupled to the sensor. The ECU is configured to determine whether the electronic device is within the vehicle. The ECU is also configured to provide a notification to a user of the vehicle regarding the presence of the electronic device within the vehicle.

Also described is a vehicle including an interior space including at least one of a trunk or a passenger cabin. The vehicle also includes a sensor configured to detect sensor data indicating a presence of an electronic device within the interior space. The vehicle also includes an electronic control unit (ECU) communicatively coupled to the sensor. The ECU is configured to determine whether the electronic device is within the interior space. The ECU is also configured to provide a notification to a user of the vehicle regarding the presence of the electronic device within the interior space.

Also described is a method for monitoring a vehicle. The method includes detecting, by a sensor of the vehicle, sensor data indicating a presence of an electronic device within the vehicle. The method also includes determining, by an electronic control unit (ECU) of the vehicle, whether the electronic device is within the vehicle based on the sensor data. The method also includes providing, by the ECU, a notification to a user of the vehicle regarding the presence of the electronic device within the vehicle.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Figure 1:
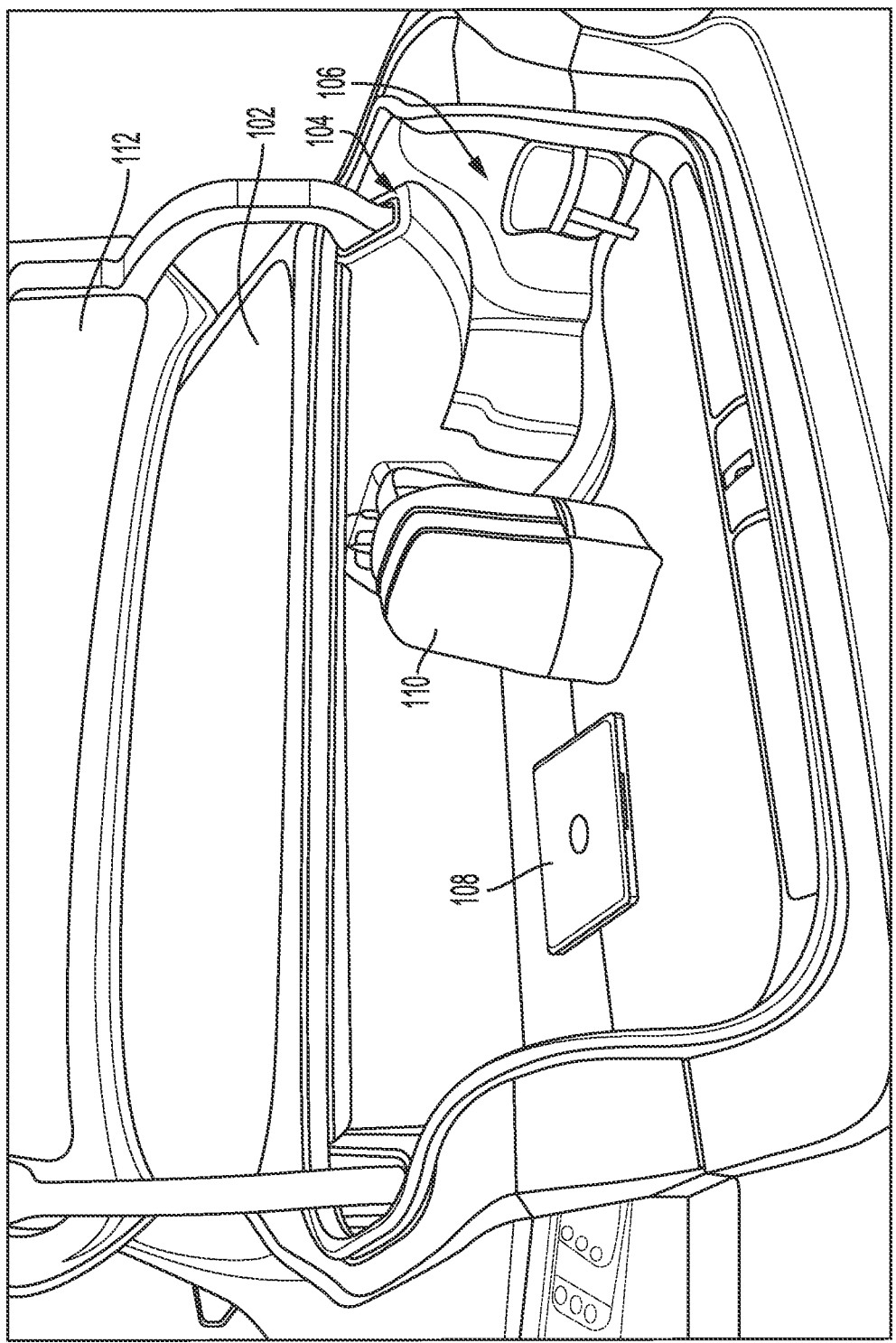
FIG. 1 illustrates a trunk of a vehicle, according to various embodiments of the invention.

Disclosed herein are systems, vehicles, and methods for detecting electronic devices in a vehicle, and steps taken in response. The systems, vehicles, and methods disclosed herein automatically detect the presence of an electronic device left within a vehicle (e.g., in a trunk or a rear compartment), and provides an alert to the user of the vehicle. The alert to the user of the vehicle provides the user of the vehicle with an opportunity to disable transmission of signals from the electronic device (e.g., Bluetooth signals, Wi-Fi signals) or to remove the electronic device from the vehicle and take the electronic device with the user.

In some situations, thieves may use signal scanners (e.g., Bluetooth signal scanners) to detect signals from electronic devices emitted from unattended vehicles. These thieves may then target these vehicles for breaking into, in order to steal the electronic device located inside the vehicle. The signals from the electronic devices may be any kind of signal (e.g., beaconing signal, pairing signal, data transmission signal, advertising signal) that is detectable using another device.

By providing a warning to the user of the vehicle, the systems and methods described herein can mitigate the chances of a targeted break-in of the vehicle. The systems and methods described herein use multiple sensors to detect the presence of the electronic device and provide multiple notifications for the user, as will be described further herein.

The systems and methods described herein, if used by many vehicles, may help to reduce the incidence of targeted break-ins into vehicles. In some situations, the user or owner of the vehicle may be in the vicinity when the vehicle is being broken into, leading to a potential face-to-face conflict. However, if the incidence of vehicle break-ins is reduced, then the risk of a face-to-face conflict may be reduced, and safety in the aggregate may be improved.

In addition, the conditions of a parked vehicle may not be ideal for an electronic device. In the summer months, the temperature inside a parked vehicle may rise to a level where an electronic device that is turned on and inside the vehicle may overheat and be permanently damaged. In the winter months, the temperature inside a parked vehicle may fall to a level where an electronic device that is located inside the vehicle may suffer adverse effects from potentially freezing temperatures.

Thus, the systems and methods described herein benefit the safety of vehicles and vehicle owners and operators, as well as the integrity of the electronic devices detected within the vehicle.

As used herein, "driver" may refer to a human being driving the vehicle when the vehicle is a non-autonomous vehicle, and/or "driver" may also refer to one or more computer processors used to autonomously or semi-autonomously drive the vehicle. "User" may be used to refer to the driver or occupant of the vehicle when the vehicle is a non-autonomous vehicle, and "user" may also be used to refer to an occupant of the vehicle when the vehicle is an autonomous or semi-autonomous vehicle.

FIG. 1 illustrates a vehicle 102 having a trunk 104. The trunk 104 includes a cavity 106 defined by walls of the trunk 104. The trunk may be enclosed by a lid 112 that pivotably moves relative to the trunk 104 between an open position and a closed position. The trunk 104 may be accessible from the passenger cabin of the vehicle 102. For example, the trunk 104 may be accessible by folding down a rear seat. In some embodiments, the trunk is not a fully enclosed area and is open for access from the passenger cabin behind a rear seat.

The trunk 104 may house cargo within the cavity 106. As shown in FIG. 1, an electronic device 108 and a bag 110 are located within the cavity 106 of the trunk 104. The electronic device 108 may be located within the bag 110 or any other vessel, such as a laptop sleeve or luggage. While the electronic device 108 is illustrated in the figures as being a laptop, any electronic device may be applicable, such as a smartphone or a tablet, for example.

The vehicle 102 may have one or more trunk sensors configured to detect trunk data indicating when the lid 112 is opened and closed. The vehicle 102 may also have one or more weight sensors located in the trunk 104 configured to detect weight data indicating when cargo is placed in the trunk 104. The vehicle 102 may also have one or more image sensors configured to detect image data indicating when cargo is placed in the trunk 104 and what kind of cargo. The vehicle 102 may also have one or more electronic device radio sensors configured to detect signals from the electronic device 108, such as Wi-Fi or Bluetooth signals.

Using these sensors, the vehicle 102 may be capable of detecting when the electronic device 108 is placed within the trunk 104. For example, the trunk sensor may detect when a user opens the trunk, and the weight sensor may detect when cargo is placed within the trunk. The image sensors may also detect that cargo has been placed within the trunk. The electronic device radio sensors may be configured to detect when signals (e.g., beaconing signals) are transmitted from the electronic device 108. Thus, if the trunk sensor detects that the trunk has been opened, the weight sensor and/or image sensor detects that cargo has been placed in the trunk (that was not previously present), and the electronic device radio sensor detects that an electronic device is in the vicinity (that was not previously detected), then it may be determined that an electronic device 108 is now within the trunk 104. The trunk sensor may detect when the lid 112 is closed.

When these situations are detected, and the vehicle 102 is locked and/or the user travels away from the vehicle 102, a notification may be provided to the user, as will be described further herein. This may happen as a result of being distracted or limited visibility of the electronic device 108 within the vehicle 102.

While the trunk is shown in FIG. 1, the electronic device 108 may generally be in any interior space of the vehicle 102, which includes the trunk 104 and/or a passenger cabin and any compartments thereof (e.g., glove compartment, center console, rear compartment), or any attached storage unit, such as a roof-mounted storage compartment. For example, an electronic device 108 may be placed on a seat, underneath a seat, or in a seat back pocket. One or more sensors may be used to detect the presence of the electronic device 108 in the passenger cabin, such as a door sensor may detect door data indicating when a door has been opened, a weight sensor detecting weight data (e.g., on a seat, floor, or other surface) indicating the presence of an object, an image sensor within the passenger cabin may detect image data of the electronic device 108 within the vehicle, or one or more electronic device radio sensors configured to detect signals from the electronic device 108, such as Wi-Fi or Bluetooth signals.

Figure 2:
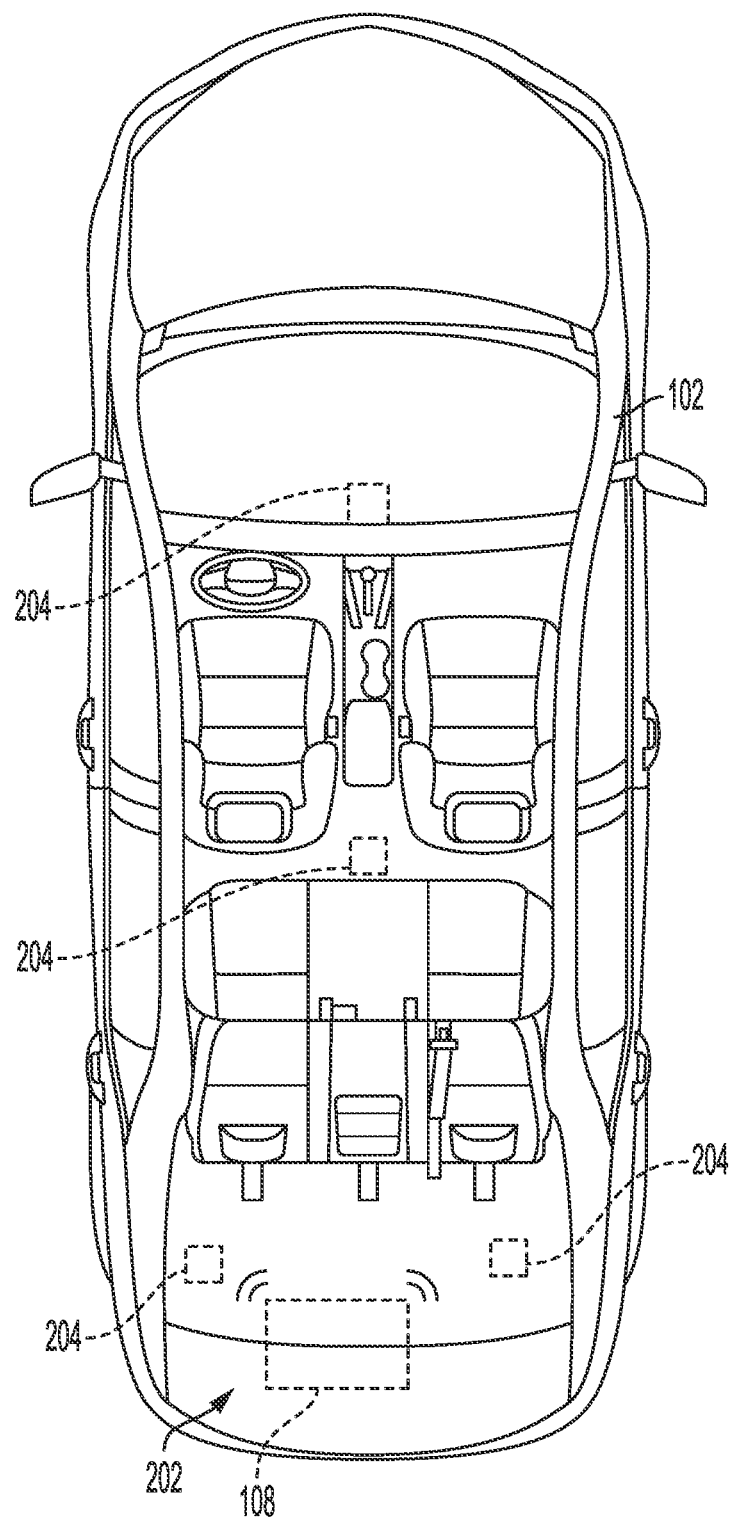
FIG. 2 illustrates sensors of the vehicle for detecting electronic devices, according to various embodiments of the invention.

FIG. 2 illustrates the vehicle 102 showing the electronic device 108 in the trunk 104 and one or more electronic device radio sensors 204 located in the vehicle 102. There may be one or more electronic device radio sensors 204 located in the trunk 104 and one or more electronic device radio sensors 204 located in the passenger cabin (e.g., in a central area of the passenger cabin or in the infotainment unit). The electronic device radio sensors 204 may be configured to detect signal data from the electronic device 108. The signal data may include a signal strength indicating a proximity of the electronic device 108 to the corresponding electronic device radio sensor 204, a direction from which the signal is being received, an identification of the electronic device 108 (e.g., laptop, smartphone, tablet), and/or whether the electronic device 108 is currently paired to another device.

When a plurality of electronic device radio sensors 204 are used in the vehicle 102, the location of the electronic device 108 may be determined based on the comparative signal strength detected by each of the plurality of electronic device radio sensors 204. For example, if the electronic device radio sensor 204 located in the trunk detects a strong signal, the electronic device radio sensor 204 near the driver's side rear passenger seat detects a moderate signal, and the electronic device radio sensor 204 in the infotainment unit detects a weak signal, it may be determined that the electronic device 108 is in the trunk or near the rear seats of the vehicle 102. In addition, any directionality information detected by the electronic device radio sensors 204 may be used to determine the location of the electronic device 108.

The plurality of electronic device radio sensors 204 may also be used to determine whether the detected electronic device 108 is within the vehicle 102 or is outside the vehicle and in possession of a person passing by the vehicle 102. For example, if the electronic device radio sensor 204 in the trunk detects a strong signal, but the electronic device radio sensor 204 near the driver's side rear passenger seat detects a weak signal, and the electronic device radio sensor 204 in the infotainment unit detects a no signal, then the detected electronic device may not be in the vehicle 102 at all.

The signals from the electronic device 108 detected by the electronic device radio sensors 204 may be any signal wirelessly communicated using a wireless communication protocol. The electronic device radio sensors 204 may include one or more radios configured to detect and/or receive data in various wireless communication protocols. For example, the electronic device radio sensors 204 may each be configured to detect signals communicated from the electronic device 108 that are in accordance with Wi-Fi, Bluetooth, ZigBee, 3G, 4G, 5G, NFC, or RFID communication protocols, for example. This is not an exhaustive list of wireless communication protocols that the electronic device radio sensors 204 are capable of detecting. Any and all variants and versions of the aforementioned communication protocols may be capable of being detected by the electronic device radio sensors 204. The signals from the electronic device may include pairing signals, beaconing signals, advertisement signals, data transmission signals, for example.

In some embodiments, the electronic device radio sensors 204 may merely detect that a signal is received, but the electronic device radio sensors 204 may not store the data payload of the received signal. In many situations, the electronic device radio sensors 204 may lack the authentication information necessary to decrypt data received via one or more wireless communication protocols.

Using the electronic device radio sensors 204 alone, the vehicle 102 may not conclusively determine that an electronic device 108 is located within the vehicle 102. Thus, additional sensor data, such as the trunk sensor data, the weight sensor data, and/or the image sensor data may be used to confirm a detection by the electronic device radio sensors 204 that an electronic device 108 is in the vicinity and may be within the vehicle 102. Artificial intelligence and/or machine learning techniques may be used to detect the presence of an electronic device 108 based on image data. The electronic device 108 does not need to be electrically or electronically connected to the vehicle 102 for the electronic device radio sensors 204 to detect that the electronic device 108 is located within the vehicle 102.

The sensor data may be analyzed by a computer processor of the vehicle (e.g., ECU) or a computer processor of a remote data server to automatically determine whether an electronic device 108 is located in the vehicle 102 and/or has been left behind in the vehicle 102.

Figure 3B:
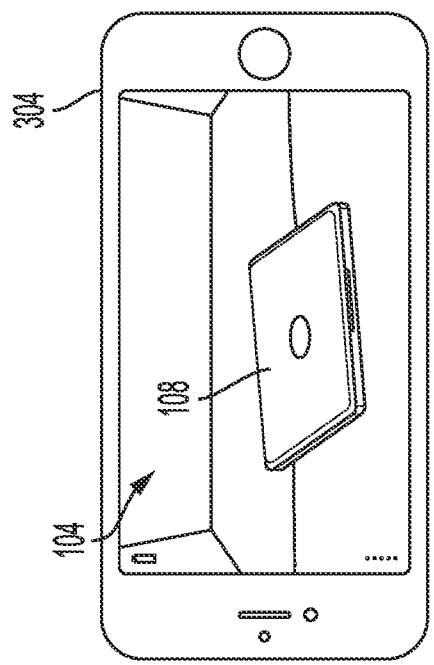
FIG. 3B illustrates real-time display of the electronic device, according to various embodiments of the invention.
Figure 3A:
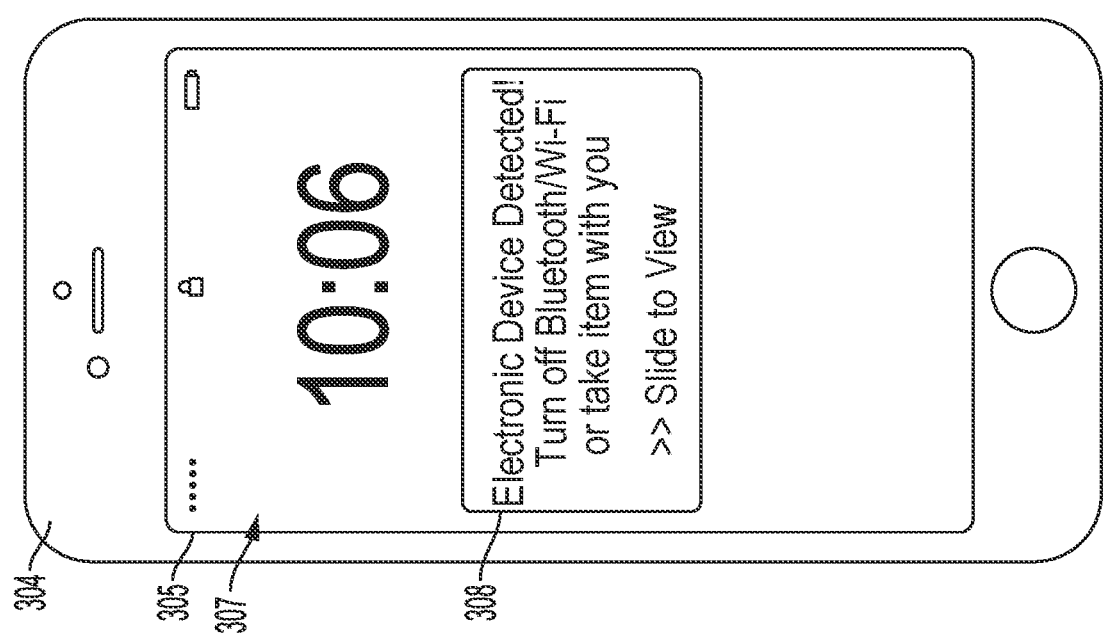
FIG. 3A illustrates an alert following detection of electronic devices, according to various embodiments of the invention.

FIG. 3A illustrates another mobile device 304 of a user of the vehicle, where the mobile device 304 is a separate mobile device than the electronic device 108. For example, the electronic device 108 may be a laptop, and the mobile device 304 may be a smartphone, or the electronic device 108 may be a tablet, and the mobile device 304 may be a smartphone, or the electronic device 108 may be a laptop, and the mobile device 304 may be a tablet.

The user of the vehicle 102 may be any individual who is associated with the vehicle 102, such as an owner of the vehicle or a recognized driver or occupant of the vehicle. The mobile device 304 of the user may be registered and associated with the vehicle 102 for allowing communications between the mobile device 304 and the vehicle 102. The mobile device 304 may be any device with a processor, a memory, an input device (e.g., touchscreen, mouse, keyboard, stylus), an output device (e.g., display screen, touchscreen), and a transceiver for communicating and receiving data.

After the vehicle 102 detects that an electronic device 108 is located in the vehicle, a warning communication may be provided to the user of the vehicle 102. The warning communication may be an audible alert or visual alert from the vehicle 102 to catch the attention of the user as the user exits the vehicle 102. The warning communication may be sent via the mobile device 304. The warning communication may include a general notification that the electronic device 108 is in the vehicle 102. The warning communication may, more specifically, include an identification of the object (e.g., smartphone, laptop, tablet) that is detected as being within the vehicle 102. The mobile device 304 may include a processor configured to render a graphical user interface providing the notification and providing particular actions for the user to take.

As shown in FIG. 3A, the mobile device 304 includes a display screen 305 for presenting a graphical user interface 307. One or more processors of the mobile device 304 may render the graphical user interface 307 that is displayed on a display screen 305 of the mobile device 304. As shown, the graphical user interface 307 is displaying a lock screen, whereby engagement with the mobile device 304 is limited. The graphical user interface 307 includes an icon 308 that notifies the user that a mobile device is detected in the vehicle 102. The icon 308 also includes a helpful suggestion to turn off Bluetooth or Wi-Fi or to take the electronic device 108 with the user.

The icon 308, when engaged, may unlock the mobile device 304 or prompt the user to provide authentication (e.g., fingerprint, facial recognition, password, passcode, or pattern) for unlocking the mobile device 304 to enable full functionality. In some embodiments, engaging the icon 308 allows for limited use of the mobile device capabilities without providing authentication.

As shown, the icon 308 specifies that an electronic device is detected in the vehicle. In other embodiments, the information may be more or less specific. For example, in some embodiments, the icon 308 may indicate that an object was detected in the vehicle, and the user may investigate further using the full functionality of the mobile device 304. In other embodiments, the icon 308 may be more specific if the specific electronic device is able to be identified. The icon 308 may indicate that "Your laptop is detected as being in the vehicle" or "Your work laptop is detected as being in the trunk of the vehicle."

In addition to the visual indications described herein, the mobile device 304 may provide an audible indication using one or more speakers of the mobile device 304 or a tactile indication using one or more vibration units of the mobile device 304. For example, the audible indication may be a beep or chime or spoken message (e.g., "ELECTRONIC DEVICE DETECTED IN VEHICLE") may be played by the one or more speakers of the mobile device 304, so that the users of the vehicle 102 may take appropriate actions, as described herein. In another example, a vibration unit of the mobile device 304 may vibrate so that the users of the vehicle 102 may take appropriate actions, as described herein.

In some embodiments, the mobile device may be communicatively coupled to the electronic device, and the mobile device may communicate an instruction to the electronic device to cease transmission of signals (e.g., Bluetooth signals or Wi-Fi signals). By remotely deactivating the transmission of signals, the risk of detection of the electronic device within the vehicle by thieves may be reduced.

FIG. 3B illustrates a graphical user interface rendered by the mobile device 304, showing a real-time view of where the electronic device 108 is located. The real-time view may be provided using one or more image sensors of the vehicle. For example, an image sensor in the trunk 104 may show a real-time view of the electronic device 108. The user may use the real-time view to visually confirm the presence and/or location of the detected electronic device 108.

Within the trunk 104 or passenger cabin may also be one or more lights configured to provide light to improve clarity of image data detected by the image sensors. In some embodiments, the image sensor is capable of night vision with infrared lighting and other lighting sources.

In some situations, where the user may not be able to retrieve the electronic device 108 from the vehicle, the image sensors used to provide the real-time view of the electronic device 108 may be used to provide monitoring of the electronic device 108 in case the vehicle 102 is broken into.

Figure 3C:
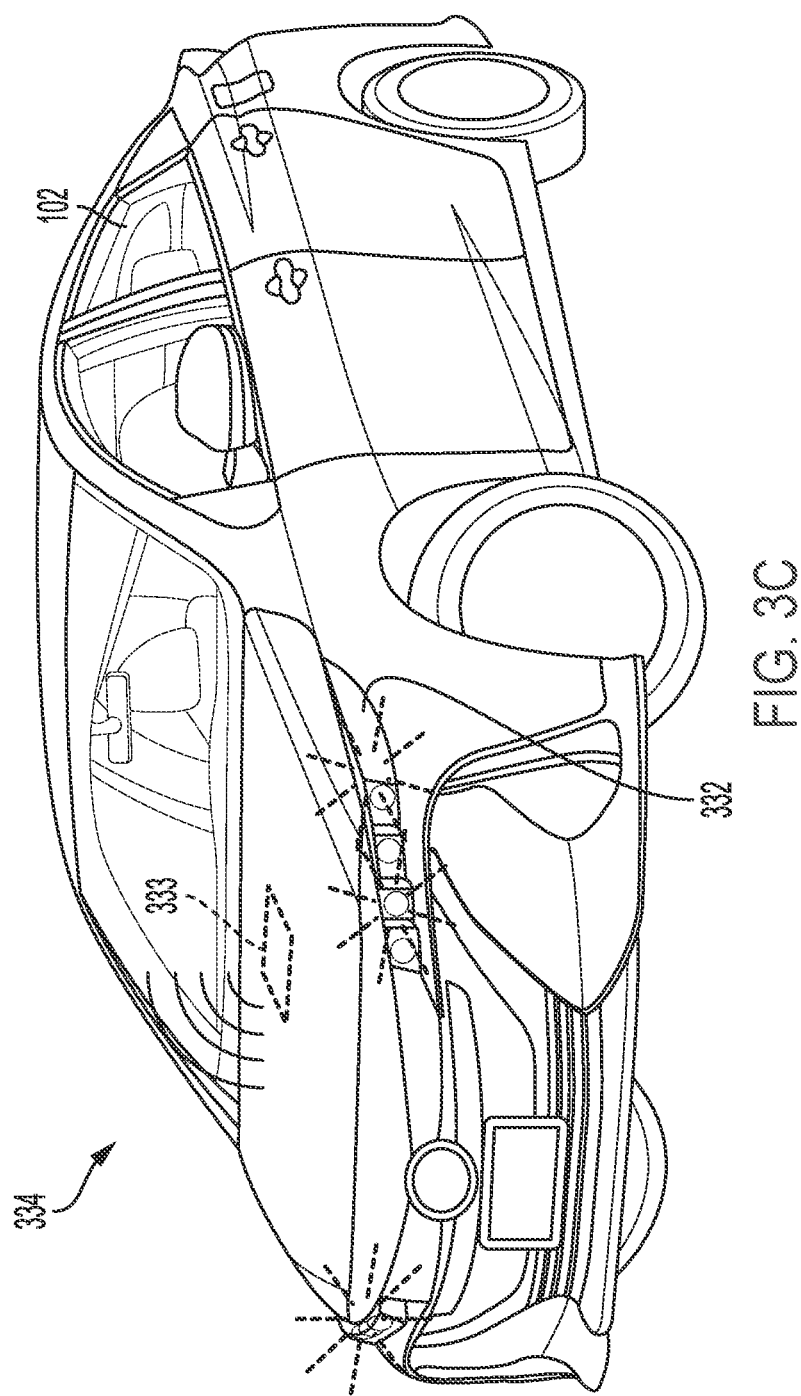
FIG. 3C illustrates a vehicle-generated alert following detection of electronic devices, according to various embodiments of the invention.

FIG. 3C illustrates the vehicle 102 providing an emergency signal using a horn 333 and/or lights 332. The horn 333 and/or lights 332 may be used to catch the attention of those exiting the vehicle 102, to alert them to the detection of an electronic device 108 left behind in the vehicle 102.

Figure 3D:
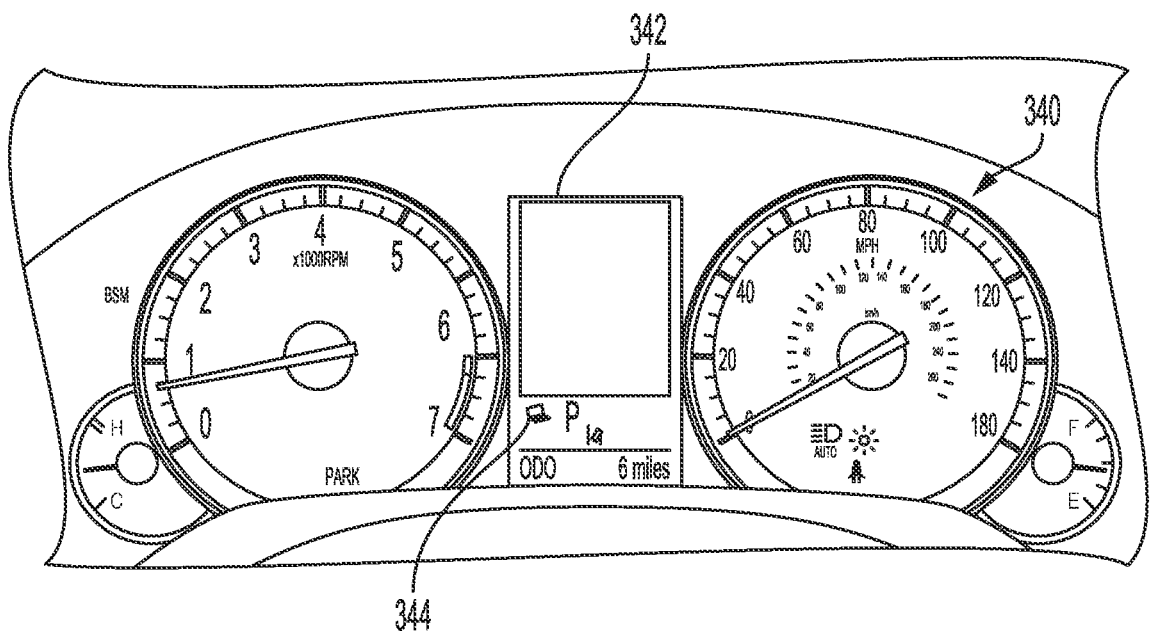
FIGS. 3D and 3E illustrate a vehicle-generated alert on an instrument panel following detection of electronic devices, according to various embodiments of the invention.
Figure 3E:
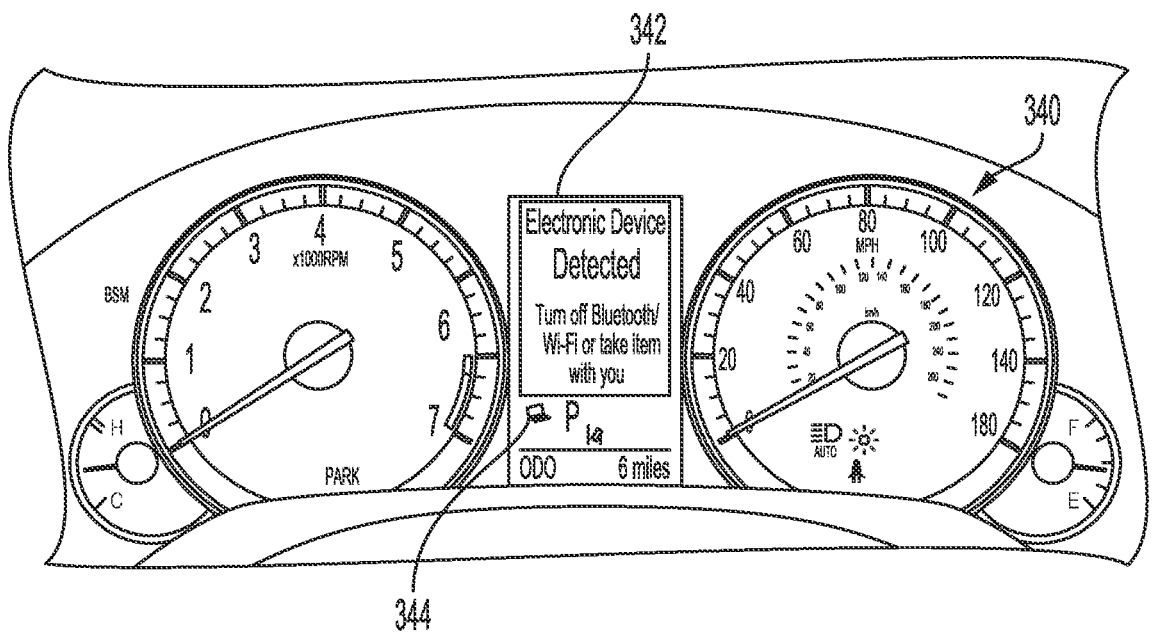

FIGS. 3D and 3E illustrate display screens of the vehicle 102 that may also provide a warning for the user of the vehicle 102. A display screen 342 of the vehicle 102 may display an indication 344 that an electronic device 108 was detected as being within the vehicle 102. The display screen 342 may be part of an instrument panel, as shown in FIGS. 3D and 3E, but may also be part of an infotainment unit or a rear entertainment system. The indication 344 may be an icon that is illuminated when the vehicle 102 detects that an electronic device 108 is in the vehicle 102.

In some embodiments, the indication 344 is continuously displayed as long as the vehicle 102 detects the presence of the electronic device 108. For example, prior to the electronic device 108 being placed in the vehicle 102, the indication 344 may be off or not illuminated. When the vehicle 102 detects the presence of the electronic device 108, using any of the sensors and methods described herein, the indication 344 may become illuminated. The indication 344 may remain illuminated as the vehicle 102 is being operated. In some embodiments, the vehicle 102 periodically detects whether the electronic device 108 is in the vehicle 102, and unless the electronic device 108 is no longer detected as being in the vehicle (or the port of the electronic device 108 responsible for communicating the wireless signals is deactivated or turned off), the indication 344 will remain illuminated.

When the vehicle 102 is turned off (e.g., the engine or motor is turned off), the display 342 may display a reminder message or notification, as shown in FIG. 3E. The message or notification may indicate to the user that the electronic device 108 is detected in the vehicle and that the user should either take the electronic device 108 with them or adjust the settings of the electronic device 108 to cease transmission of signals (e.g., Bluetooth or Wi-Fi signals). The indication 344 may remain illuminated until the electronic device 108 is removed from the vehicle or the port of the electronic device 108 responsible for communicating the wireless signals is deactivated or turned off.

When the vehicle 102 is locked or after a threshold amount of time has passed after the vehicle 102 is turned off, the display 342 (in particular, the notification of the presence of the electronic device 108 and the indication 344) may be turned off.

In addition to the indications and notifications shown in FIGS. 3D and 3E, additional information about the detected electronic device 108, such as the type of device (e.g., laptop, smartphone, tablet) or the location of the device within the vehicle (e.g., trunk, under the front passenger's seat) may also be provided.

The displays shown in FIGS. 3D and 3E may remind the user at a time when the presence of the electronic device 108 is made aware to the user and the user is promptly able to either take the electronic device 108 with them or adjust the settings of the electronic device 108 to cease transmission of signals (e.g., Bluetooth or Wi-Fi signals).

In addition to the visual cues described herein, the vehicle 102 may provide an audible indication using one or more speakers of the vehicle or a tactile indication using one or more vibration units of the vehicle 102. The audible indication and/or tactile indication may be provided as the vehicle 102 is turned off. For example, a beep or chime or spoken message (e.g., "ELECTRONIC DEVICE DETECTED") may be played by the one or more speakers when the vehicle 102 is turned off, so that the users of the vehicle 102 may be notified as they are preparing to exit the vehicle 102 that an electronic device 108 is detected as being in the vehicle 102, and to take appropriate steps, as described herein. In another example, a vibration unit may vibrate when the vehicle 102 is turned off, so that the users of the vehicle 102 may be notified as they are preparing to exit the vehicle 102 that an electronic device 108 is detected as being in the vehicle 102, and to take appropriate steps, as described herein. The vibration unit may be located anywhere in the vehicle 102 in vicinity of the occupants, such as in seats and/or the steering wheel.

Figure 4:
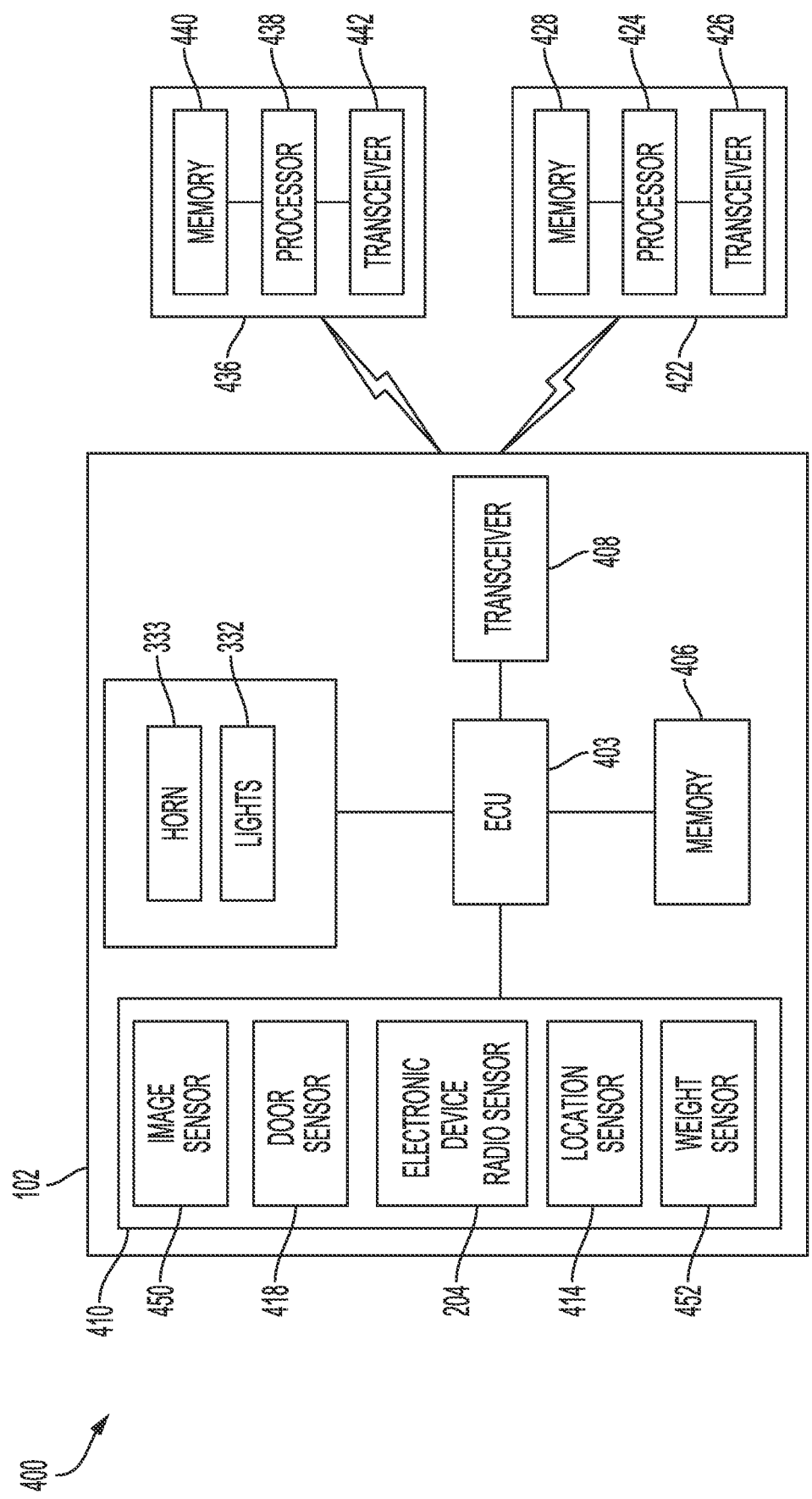
FIG. 4 is a block diagram of the system, according to various embodiments of the invention.

FIG. 4 illustrates an example system 400, according to various embodiments of the invention. The system may include a vehicle 102. The vehicle 102 may have an automatic or manual transmission. The vehicle 102 is a conveyance capable of transporting a person, an object, or a permanently or temporarily affixed apparatus. The vehicle 102 may be a self-propelled wheeled conveyance, such as a car, a sports utility vehicle, a truck, a bus, a van or other motor or battery driven vehicle. For example, the vehicle 102 may be an electric vehicle, a hybrid vehicle, a plug-in hybrid vehicle, a fuel cell vehicle, or any other type of vehicle that includes a motor/generator. Other examples of vehicles include bicycles, trains, planes, or boats, and any other form of conveyance that is capable of transportation. The vehicle 102 may be a semi-autonomous vehicle or an autonomous vehicle. That is, the vehicle 102 may be self-maneuvering and navigate without human input. An autonomous vehicle may use one or more sensors and/or a navigation unit to drive autonomously.

The vehicle 102 also includes one or more computers or electronic control units (ECUs) 403, appropriately programmed, to control one or more operations of the vehicle 102. The one or more ECUs 403 may be implemented as a single ECU or in multiple ECUs. The ECU 403 may be electrically coupled to some or all of the components of the vehicle 102. In some embodiments, the ECU 403 is a central ECU configured to control one or more operations of the entire vehicle. In some embodiments, the ECU 403 is multiple ECUs located within the vehicle and each configured to control one or more local operations of the vehicle. In some embodiments, the ECU 403 is one or more computer processors or controllers configured to execute instructions stored in a non-transitory memory 406.

Although FIG. 4 illustrates various elements connected to the ECU 403, the elements of the vehicle 102 may be connected to each other using a communications bus.

The vehicle 102 may be coupled to a network via a transceiver 408. The network, such as a local area network (LAN), a wide area network (WAN), a cellular network, a digital short-range communication (DSRC), the Internet, or a combination thereof, connects the vehicle 102 to a remote data server 436 and/or a mobile device 422.

The transceiver 408 may include a communication port or channel, such as one or more of a Wi-Fi unit, a Bluetooth® unit, a Radio Frequency Identification (RFID) tag or reader, a DSRC unit, or a cellular network unit for accessing a cellular network (such as 3G, 4G, or 5G). The transceiver 408 may transmit data to and receive data from devices and systems not directly connected to the vehicle. For example, the ECU 403 may communicate with a remote data server 436 and/or a mobile device 422. Furthermore, the transceiver 408 may access the network, to which the remote data server 436 and the mobile device 422 is also connected.

The vehicle 102 includes a sensor array 410 connected to the ECU 403. The sensor array 410 may include one or more image sensors 450, one or more door sensors (including trunk lid sensors) 418, one or more electronic device radio sensors 204, one or more location sensors 414, and one or more weight sensors 452, each as described herein.

The electronic device radio sensors 204 may be configured to detect signal data from the electronic device 108. The signal data may include a signal strength indicating a proximity of the electronic device 108 to the corresponding electronic device radio sensor 204, a directionality of the received signal, an identification of the electronic device 108 (e.g., laptop, smartphone, tablet), and/or whether the electronic device 108 is currently paired to another device. The electronic device radio sensors 204 may detect signals of many different communication protocols, such as Bluetooth or Wi-Fi, for example. Accordingly, the system 400 may include corresponding communication modules for each communication protocol (e.g., a Bluetooth module or Wi-Fi module).

In some embodiments, the electronic device radio sensors 204 and the transceiver 408 are a common device, as the transceiver 408 may be capable of communicating with other computing devices, as well as detecting signals from electronic devices (e.g., electronic device 108) within the vehicle 102. In some embodiments, the electronic device radio sensors 204 and the transceiver 408 are separate devices. In these embodiments, the electronic device radio sensors 204 may be limited to detecting signals from electronic devices, and may not be capable of effectively or efficiently transmitting data, as compared to the transceiver 408.

The electronic device radio sensors 204 may periodically detect signal data or may continuously detect signal data. For example, the electronic device radio sensors 204 may detect signal data every 5 minutes, 10 minutes, or every 30 minutes. The electronic device radio sensors 204 may dynamically detect signal data based on various factors. For example, when the vehicle is moving (e.g., a speed sensor detects the vehicle moving at a speed greater than a threshold speed), the electronic device radio sensors 204 may not detect signal data or may detect signal data less frequently than if the vehicle was not moving. In another example, the electronic device radio sensors 204 may detect signal data more frequently when the vehicle is located in an area where thefts are more commonly reported. In these areas, it may be more helpful for the user of the vehicle to know when the user has accidentally left an electronic device in the vehicle and to be notified about it.

The image sensors 450 are configured to detect image data within the vehicle 102, including the passenger cabin and/or the trunk. The image data may be used to determine whether the electronic device 108 is located in the vehicle 102 and whether the electronic device 108 was left behind. The image sensors 450 may also be configured to detect image data outside of the vehicle 102 to determine whether the user had walked away from the vehicle 102 without removing the electronic device 108 from the vehicle 102. Thus, there may be one or more image sensors 450 within the vehicle 102 and one or more image sensors outside of the vehicle 102.

The image data may be communicated to the ECU 403, and the ECU 403 may detect whether the electronic device 108 is located in the vehicle 102 and/or has been left behind in the vehicle 102, as described herein. The image data may also be communicated to the remote data server 436 and/or the mobile device 422, as described herein. In addition, the image sensors 450 themselves may be capable of detection of the image data as well as detection of whether the electronic device 108 is located in the vehicle 102 and/or has been left behind in the vehicle 102. The image sensors 450 may also be capable of identification of the electronic device 108. In this regard, the image sensors 450 may use artificial intelligence or machine learning techniques, as described herein, for detection of whether the electronic device 108 is located in the vehicle 102 and/or has been left behind in the vehicle 102.

The door sensors 418 are configured to detect door data indicating when a door and/or trunk lid is opened or closed, and which door (or trunk lid) was opened or closed. The door data may also include a length of time that the door (or trunk lid) was open. The door data may also include a degree to which the door (or trunk lid) was open. As described herein, the door data may be used to determine whether an electronic device 108 was placed in the vehicle 102.

The location sensor 414 is configured to determine location data. The location sensor 414 may be a GPS unit or any other device for determining the location of the vehicle 102. The ECU 403 may use the location data along with the map data to determine a location of the vehicle 102. In other embodiments, the location sensor 414 has access to the map data and may determine the location of the vehicle 102 and provide the location of the vehicle 102 to the ECU 403. The location data may be used to determine a frequency of detection of an electronic device 108 within the vehicle 102, as described herein.

The weight sensors 452 are configured to detect weight data. The weight sensors 452 may be located on seats or in the floor or in the trunk of the vehicle 102. The weight data may be communicated to the ECU 403, and the ECU 403 may detect whether cargo, including the electronic device 108, is located in the vehicle 102.

The memory 406 is connected to the ECU 403 and may be connected to any other component of the vehicle 102. The memory 406 is configured to store any data described herein, such as the map data, the location data, the image data, the weight data, door sensor data, signal data, and any data received from the remote data server 436 and/or mobile device 422 via the transceiver 408.

The vehicle 102 also includes vehicle devices, such as horn 333, lights 332, and displays 430 (e.g., display 342). The ECU 403 may provide instructions to each vehicle device for controlling the respective vehicle device. The ECU 403 may instruct the horn 333 to produce a noise. The ECU 403 may instruct the lights 332 to flash. The ECU 403 may instruct the displays 430 to display messages or indications (e.g., indication 344).

The remote data server 436 may include a non-transitory memory 440, a processor 438 configured to execute instructions stored in the non-transitory memory 440, and a transceiver 442 configured to transmit and receive data to and from other devices, such as the vehicle 102. The remote data server 436 may be one or more servers from different service providers. Each of the one or more servers may be connected to one or more databases. A service provider may provide data to the vehicle 102, such as navigational map, weather and/or traffic data, for example.

A database is any collection of pieces of information that is organized for search and retrieval, such as by a computer or a server, and the database may be organized in tables, schemas, queries, report, or any other data structures. A database may use any number of database management systems and may include a third-party server or website that stores or provides information. The information may include real-time information, periodically updated information, or user-inputted information. A server may be a computer in a network that is used to provide services, such as accessing files or sharing peripherals, to other computers in the network. A website may be a collection of one or more resources associated with a domain name. The information may also include the image data from the ECU 403 that will be used to train the AI model to improve detection and/or identification of the electronic device 108. The training of the AI model may be performed by any computing device described herein, such as the ECU 403, the processor 438 of the remote data server 436, or the processor 424 of the mobile device 422, for example.

Also included in the system is a mobile device 422 (e.g., mobile device 304), which includes a processor 424 configured to execute instructions stored in non-transitory memory 428. The mobile device 422 also includes a transceiver 426 similar to transceiver 408 and transceiver 442. The mobile device 422 also includes an input/output device configured to receive inputs from the user and display outputs to the user, as described herein. The input/output device may be an input device (or input unit) such as a touchscreen, a microphone, a stylus, or a keyboard and an output device (or output unit) such as a touchscreen (e.g., screen 305), a display screen (e.g., screen 305), or a speaker.

As described herein, the mobile device 422 may be used to provide notifications and image data to the user about a detected electronic device 108 in the vehicle 102. The mobile device 422 may receive the live video from the ECU 403 directly or indirectly over the network.

As used herein, a "unit" may refer to hardware components, such as one or more computer processors, controllers, or computing devices configured to execute instructions stored in a non-transitory memory.

Where the vehicle is described as making a determination or otherwise performing an action, the ECU 403 of the vehicle 102 may make the determination or coordinate performance of the action. Similarly, where the remote data server is described as making a determination or otherwise performing an action, the processor 438 of the remote data server 436 may make the determination or coordinate performance of the action. Similarly, where the mobile device is described as making a determination or otherwise performing an action, the processor 424 of the mobile device 422 may make the determination or coordinate performance of the action.

Figure 5:
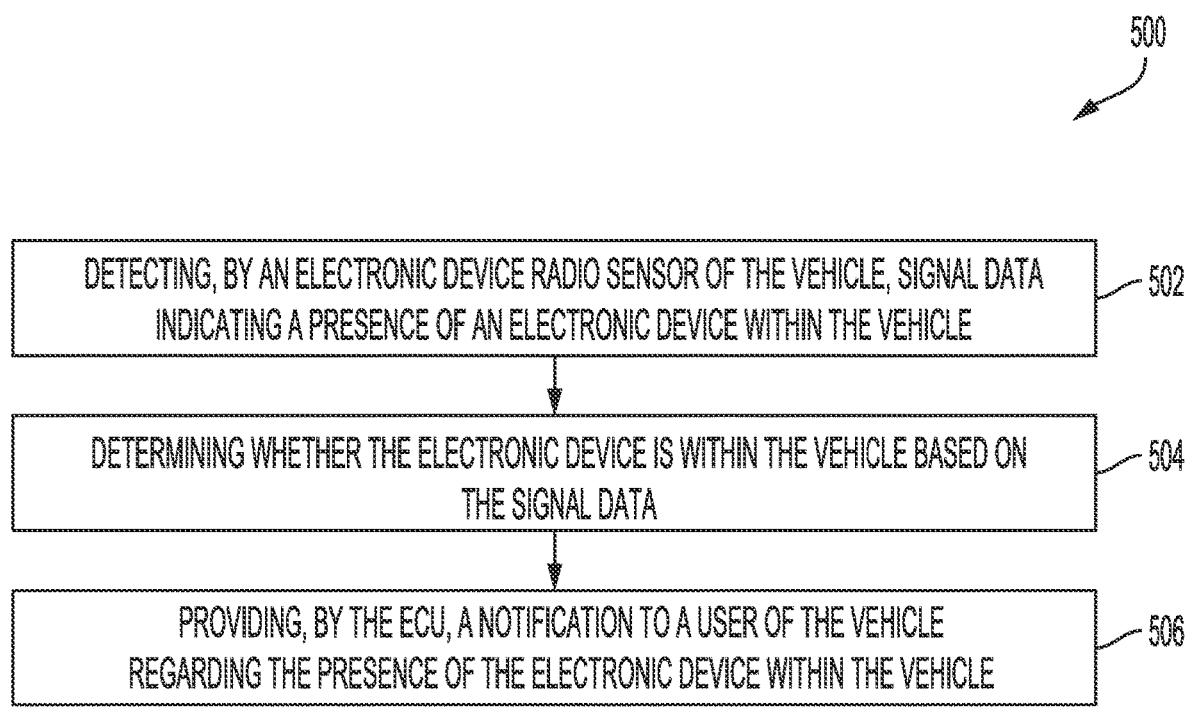
FIG. 5 is a flow diagram of a process performed by the system, according to various embodiments of the invention.

FIG. 5 illustrates a flowchart of a process 500 performed by the systems described herein.

An electronic device radio sensor (e.g., electronic device radio sensor 204) of the vehicle (e.g., vehicle 102) detects signal data indicating the presence of an electronic device (e.g., electronic device 108) within the vehicle (step 502).

It is determined whether the electronic device is within the vehicle based on the signal data (step 504). In some embodiments, the ECU (e.g., ECU 403) determines whether the electronic device is within the vehicle based on the signal data. In some embodiments, the electronic device radio sensor is capable of making the determination, and may communicate this determination to the ECU. In some embodiments, the signal data is communicated by the ECU, using a transceiver (e.g., transceiver 408) to a remote data server (e.g., remote data server 436). The remote data server receives the signal data using its own transceiver (e.g., transceiver 442) and uses a processor (e.g., processor 438) to determine whether the electronic device is within the vehicle based on the signal data. While one remote data server is shown and described, multiple remote data servers may be used for computational efficiency and computational load distribution.

The ECU provides a notification to the user of the vehicle regarding the presence of the electronic device within the vehicle (step 506). The notification may be an indication (e.g., indication 344) or text on a display screen within the vehicle. The notification may be an audible sound or other visual cue or vibration generated by the vehicle. Where the notification is a visual notification, the ECU renders a graphical user interface to visually present the notification to the user or instructs a light (e.g., lights 332) to flash. Where the notification is an audible notification, the ECU instructs a speaker (e.g., speaker within the passenger cabin or horn 333) of the vehicle to provide the notification. Where the notification is a tactile notification, the ECU instructs a vibration unit to provide the notification.

The notification may be a visual, audible, or tactile notification provided by a mobile device (e.g., mobile device 422) of the user. The ECU may communicate, using the transceiver, notification data to the mobile device of the user. The mobile device of the user receives the notification data using its own transceiver (e.g., transceiver 426) and the processor (e.g., processor 424) generates the notification. Where the notification is a visual notification, the processor renders a graphical user interface to visually present the notification to the user. Where the notification is an audible notification, the processor instructs a speaker of the mobile device to provide the notification. Where the notification is a tactile notification, the processor instructs a vibration unit to provide the notification.

One or more sensors, in addition to the electronic device radio sensor, may detect sensor data. The one or more sensors may include a door sensor (e.g., door sensor 418), a weight sensor (e.g., weight sensor 452), or an image sensor (e.g., image sensor 450). The door sensor may include a trunk sensor configured to detect when the trunk lid is opened or closed.

A single sensor may be used, or a combination of multiple sensors may be used. A first one or more sensors may be used to detect that cargo was placed in the vehicle. For example, the door sensor may detect door data indicating that a door (or trunk lid) was opened. This alone may indicate that cargo (e.g., electronic device) was placed in the vehicle. In another example, the door sensor may detect door data indicating that a door (or trunk lid) was opened and a weight sensor may detect weight data indicating that an object (e.g., electronic device) was introduced to the vehicle (e.g., due to a weight increase reflected by the weight data). In another example, the door sensor may detect door data indicating that a door (or trunk lid) was opened, a weight sensor may detect weight data indicating that an object (e.g., electronic device) was introduced to the vehicle (e.g., due to a weight increase reflected by the weight data), and an image sensor may detect image data indicating that an object (e.g., electronic device) was introduced to the vehicle (e.g., due to identification of the object from the image data). In another example, the door sensor may detect door data indicating that a door (or trunk lid) was opened, and an image sensor may detect image data indicating that an object (e.g., electronic device) was introduced to the vehicle (e.g., due to identification of the object from the image data). In another example, a weight sensor may detect weight data indicating that an object (e.g., electronic device) was introduced to the vehicle (e.g., due to a weight increase reflected by the weight data) and an image sensor may detect image data indicating that an object (e.g., electronic device) was introduced to the vehicle (e.g., due to identification of the object from the image data).

A second one or more sensors may be used to confirm the detection of the electronic device in the vehicle. For example, the electronic device radio sensor may detect signals from the electronic device (e.g., Bluetooth signals, Wi-Fi signals). In another example, the image sensor may detect image data indicating that an electronic device was introduced to the vehicle (e.g., due to identification of the object from the image data).

In some embodiments, the second one or more sensors do not detect sensor data until the sensor data from the first one or more sensors indicates that an object (e.g., electronic device) was placed in the vehicle. For example, the electronic device radio sensor may not detect signal data until a weight sensor and/or door sensor detects that an object was placed in the vehicle. This may be done to reduce electrical power consumption by the electronic device radio sensor.

In some embodiments, the ECU determines whether the electronic device is within the vehicle based on the sensor data. In some embodiments, the individual sensors themselves are capable of making the determination, and may communicate this determination to the ECU, which may use the determinations from a threshold number of sensors to then take action, as described herein. In some embodiments, the sensor data is communicated by the ECU, using a transceiver (e.g., transceiver 408) to a remote data server (e.g., remote data server 436). The remote data server receives the sensor data using its own transceiver (e.g., transceiver 442) and uses a processor (e.g., processor 438) to determine whether the electronic device is within the vehicle based on the sensor data. While one remote data server is shown and described, multiple remote data servers may be used for computational efficiency and computational load distribution.

In some embodiments, where multiple electronic device radio sensors are used, the signal data detected by the multiple electronic device radio sensors may be used to determine a location of the electronic device within the vehicle. The multiple electronic device radio sensors may provide their respective signal data to the ECU and the ECU may determine the location of the electronic device, and provide the location to the user, as part of the notification, as described herein.

In some embodiments, the mobile device may receive image data from the image sensor in real-time, where the image data shows the detected electronic device. The image sensor of the vehicle corresponding to the location of the electronic device may detect image data, and the detected image data may be communicated, via the vehicle transceiver, to the mobile device. The mobile device transceiver may receive the detected image data and the processor of the mobile device may render a graphical user interface for showing the image of the electronic device to the user, using a display screen of the mobile device.

In some embodiments, the mobile device may be communicatively coupled to the electronic device, and the mobile device may communicate an instruction to the electronic device to cease transmission of signals (e.g., Bluetooth signals or Wi-Fi signals). By remotely deactivating the transmission of signals, the risk of detection of the electronic device within the vehicle by thieves may be reduced.

As described herein, the frequency of detection of the signal data by the electronic device radio sensors may be adjusted based on the location of the vehicle. A location sensor (e.g., location sensor 414) of the vehicle may be used to determine the location of the vehicle. The location of the vehicle may be determined by the ECU based on location data from the location sensor and map data stored in the memory (e.g., memory 406). The vehicle may also receive crime or theft frequency data from the remote data server using the vehicle transceiver. The ECU may compare the determined location of the vehicle to the received crime or theft frequency map data to determine a frequency of detection of the signal data by the electronic device radio sensors. For example, where the crime or theft rate is higher, the frequency of detection of the signal data by the electronic device radio sensors may be increased, compared to areas where the crime or theft rate is lower.

In some embodiments, the process 500 begins in response to one or more actions or states of the vehicle. For example, the process 500 may begin when the vehicle is parked, or when the vehicle is locked, or when the driver of the vehicle is detected as having exited the driver's seat (e.g., using a weight sensor on the driver's seat or image sensor).

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents. Features across various embodiments described herein may be combined.

What is claimed is:

1. A system for monitoring a vehicle, the system comprising:
    an electronic device radio sensor configured to detect signal data indicating a presence of an electronic device within the vehicle; and
    an electronic control unit (ECU) communicatively coupled to the electronic device radio sensor and configured to:
        determine whether the electronic device is within the vehicle based on the signal data, and
        provide a notification to a user regarding the presence of the electronic device within the vehicle, the notification including a suggestion to disable transmission of radio frequency (RF) signal from the electronic device based on a determination that the electronic device is within the vehicle.

2. The system of claim 1, further comprising a speaker or a display screen, and
    wherein the notification is an audible notification or a visual notification using, respectively, the speaker or the display screen to attract the user's attention regarding the presence of the electronic device within the vehicle.

3. The system of claim 1, further comprising a transceiver, and wherein the notification is configured to be communicated from the vehicle to a mobile device of the user using the transceiver, the mobile device of the user being configured to present the notification to the user.

4. The system of claim 1, further comprising a sensor configured to detect sensor data, the sensor being at least one of a door sensor configured to detect door data, a weight sensor configured to detect weight data, or an image sensor configured to detect image data, and
wherein the ECU is further configured to determine whether the electronic device is within the vehicle based on the sensor data.

5. The system of claim 4, wherein the ECU is configured to determine whether the electronic device is within the vehicle based on the signal data to confirm the determination of whether the electronic device is within the vehicle based on the sensor data.

6. The system of claim 1, wherein the ECU is further configured to identify the electronic device within the vehicle and a location of the electronic device within the vehicle.

7. The system of claim 1, wherein the electronic device radio sensor includes a plurality of electronic device radio sensors configured to detect signal data from the electronic device, and
wherein the ECU is further configured to determine a location of the electronic device within the vehicle based on the signal data from the electronic device detected by the plurality of electronic device radio sensors.

8. The system of claim 1, wherein the signal data is Bluetooth signal data or Wi-Fi signal data.

9. A vehicle comprising:
an interior space including at least one of a trunk or a passenger cabin;
an electronic device radio sensor configured to detect signal data indicating a presence of an electronic device within the interior space;
at least one sensor configured to detect sensor data; and
an electronic control unit (ECU) communicatively coupled to the electronic device radio sensor and the at least one sensor and configured to:
determine whether the electronic device is within the interior space based on the signal data,
confirm the determination of whether the electronic device is within the interior space based on the sensor data, and
provide a notification to a user regarding the presence of the electronic device within the interior space based on the confirmation.

10. The vehicle of claim 9, further comprising a speaker or a display screen, and
wherein the notification is an audible notification or a visual notification using, respectively, the speaker or the display screen to attract the user's attention regarding the presence of the electronic device within the interior space.

11. The vehicle of claim 9, further comprising a transceiver, and
wherein the notification is configured to be communicated to a mobile device of the user using the transceiver, the mobile device of the user being configured to present the notification to the user.

12. The vehicle of claim 9, wherein the at least one sensor includes at least one of a door sensor configured to detect door data, a weight sensor configured to detect weight data, or an image sensor configured to detect image data, and
wherein the ECU is further configured to determine whether the electronic device is within the vehicle based on the sensor data.

13. The vehicle of claim 9, wherein the ECU is further configured to identify the electronic device within the interior space and a location of the electronic device within the interior space.

14. The vehicle of claim 9, wherein the electronic device radio sensor includes a plurality of electronic device radio sensors configured to detect signal data from the electronic device, and
wherein the ECU is further configured to determine a location of the electronic device within the interior space based on the signal data from the electronic device detected by the plurality of electronic device radio sensors.

15. The vehicle of claim 9, wherein the signal data is Bluetooth signal data or Wi-Fi signal data.

16. A method for monitoring a vehicle, the method comprising:
detecting, by an electronic device radio sensor, signal data indicating a presence of an electronic device within the vehicle;
determining, by an electronic control unit (ECU), whether the electronic device is within the vehicle based on the signal data; and
providing, by the ECU, a notification to a user regarding the presence of the electronic device within the vehicle, the notification including a suggestion to disable transmission of radio frequency (RF) signal from the electronic device based on a determination that the electronic device is within the vehicle.

17. The method of claim 16, wherein the notification is an audible notification or a visual notification using, respectively, a speaker or a display screen to attract the user's attention regarding the presence of the electronic device within the vehicle.

18. The method of claim 16, further comprising:
communicating, by a transceiver, the notification from the vehicle to a mobile device; and
presenting, by the mobile device, the notification to the user.

19. The method of claim 16, further comprising detecting, by a sensor, sensor data, and
wherein determining whether the electronic device is within the vehicle by the ECU is based on the signal data and the sensor data.

* * * * *